(12) United States Patent
Hatta

(10) Patent No.: US 10,783,244 B2
(45) Date of Patent: Sep. 22, 2020

(54) INFORMATION PROCESSING SYSTEM, INFORMATION PROCESSING METHOD, AND PROGRAM

(71) Applicant: LAC CO., LTD., Chiyoda-ku, Tokyo (JP)

(72) Inventor: Junichi Hatta, Tokyo (JP)

(73) Assignee: LAC CO., LTD., Tokyo (JP)

( * ) Notice: Subject to any disclaimer, the term of this patent is extended or adjusted under 35 U.S.C. 154(b) by 187 days.

(21) Appl. No.: 15/457,328

(22) Filed: Mar. 13, 2017

(65) Prior Publication Data

US 2017/0185772 A1    Jun. 29, 2017

Related U.S. Application Data

(63) Continuation-in-part of application No. PCT/JP2016/053648, filed on Feb. 8, 2016.

(30) Foreign Application Priority Data

Feb. 16, 2015   (JP) .................................. 2015-027777

(51) Int. Cl.
*H04L 29/06* (2006.01)
*G06F 21/56* (2013.01)
*G06F 21/55* (2013.01)

(52) U.S. Cl.
CPC ............ *G06F 21/56* (2013.01); *G06F 21/552* (2013.01); *G06F 2221/034* (2013.01)

(58) Field of Classification Search
CPC ................................. H04L 63/00; G06F 21/00
See application file for complete search history.

(56) References Cited

U.S. PATENT DOCUMENTS

| | | | | |
|---|---|---|---|---|
| 9,330,257 | B2 * | 5/2016 | Valencia | G06F 21/552 |
| 9,516,050 | B2 * | 12/2016 | Koyanagi | H04L 63/1425 |
| 2011/0131005 | A1 * | 6/2011 | Ueshima | A63B 24/0062 |
| | | | | 702/141 |

FOREIGN PATENT DOCUMENTS

| | | |
|---|---|---|
| JP | 2008-160249 | 7/2008 |
| JP | 2012-084994 | 4/2012 |

* cited by examiner

*Primary Examiner* — Joseph P Hirl
*Assistant Examiner* — Leynna Truvan
(74) *Attorney, Agent, or Firm* — Greenblum & Bernstein, P.L.C.

(57) ABSTRACT

An information processing system may be configured to count the number of one or more first time periods being included in a target time period. Each of the one or more first time periods has a plurality of communications each of which satisfies at least a condition. The plurality of communications includes two communications which are more distant from each other than a second time period which is shorter than the first time period.

16 Claims, 7 Drawing Sheets

FIG. 5

| NUMBER | TRANSMISSION DESTINATION IP ADDRESS | TRANSMISSION SOURCE IP ADDRESS | TRANSMISSION SOURCE USER NAME | TRANSMISSION SOURCE COMPUTER NAME | COMMUNICATION DATE AND TIME |
|---|---|---|---|---|---|
| 1 | 50.1.1.1 | 111.22.33.44 | UserA | LAN-PC1 | 2015/1/1 10:00:00 |
| 2 | 60.2.2.2 | 122.22.33.44 | UserB | LAN-PC2 | 2015/1/1 10:00:01 |
| 3 | 50.1.1.1 | 111.22.33.44 | UserA | LAN-PC1 | 2015/1/1 10:01:00 |
| 4 | 50.1.1.1 | 111.22.33.44 | UserA | LAN-PC1 | 2015/1/1 10:05:00 |
| 5 | 70.3.3.3 | 122.22.33.44 | UserB | LAN-PC2 | 2015/1/1 10:10:00 |
| 6 | 70.3.3.3 | 133.22.33.44 | UserC | LAN-PC3 | 2015/1/1 11:00:00 |

FIG. 7

| NUMBER | TRANSMISSION DESTINATION IP ADDRESS | TRANSMISSION SOURCE IP ADDRESS | COUNT NUMBER |
|---|---|---|---|
| 1 | 50.1.1.1 | 111.22.33.44 | 1000 |
| 2 | 50.1.1.1 | 122.22.33.44 | 900 |
| 3 | 50.1.1.1 | 133.22.33.44 | 800 |
| 4 | 60.2.2.2 | 111.22.33.44 | 750 |
| 5 | 70.3.3.3 | 122.22.33.44 | 100 |
| 6 | 70.3.3.3 | 133.22.33.44 | 20 |
| 7 | 70.3.3.3 | 111.22.33.44 | 10 |
| 8 | 80.4.4.4 | 111.22.33.44 | 5 |

INFORMATION PROCESSING SYSTEM, INFORMATION PROCESSING METHOD, AND PROGRAM

CLAIM FOR PRIORITY

This application is a Continuation-In-Part of PCT/JP2016/053648 filed Feb. 8, 2016, and claims the priority benefit of Japanese application 2015-027777 filed Feb. 16, 2015, the contents of which are expressly incorporated by reference herein in their entireties.

BACKGROUND

Technical Fields

Embodiments of the present invention generally relate to an information processing system, an information processing method, and a program.

Related Art

In recent years, malware which is a representative of computer viruses has become advanced and sophisticated in both of invasion methods and attack methods, and thus it is difficult to prevent damage by the malware in advance or to localize the damage by the malware. In a case of conventional malware, a relationship between an attack and damage by the malware can be easily inferred, and though there are differences in the degree of difficulty in handling, the malware could be relatively early found. However, in a case of current malware, it is hard to notice an invasion of the malware, and great damage may occur before the malware is found.

As a technology for detecting malware, for example, Japanese Unexamined Patent Application, First Publication No. 2012-84994 discloses a malware detection device configured to determine that malware occurs in an internal network when abnormal internal communication is performed equal to or more than a predetermined number of times among internal terminals that have performed abnormal external communication equal to or more than a predetermined number of times within a predetermined time.

In addition, for example, Japanese Unexamined Patent Application, First Publication No, 2008-160249 discloses a technology which, for each connection request to an in-company network from a terminal, calculates an elapsed time from a last connection time for the terminal which made a connection request, compares the calculated elapsed time with a predetermined allowable time, and prohibits connection to the in-company network by setting the terminal that made the connection request as an inappropriate terminal when the elapsed time from the last connection time exceeds the allowable time.

A terminal infected with malware executes processing according to an instruction from an attacker, and thus communication may be repeatedly performed between the terminal and a server of the attacker being outside, for example, in a regular manner in some cases. However, such communication may be confused with other communication for the internee, and it was very difficult to detect such communication.

SUMMARY

In some embodiments, an information processing system may include, but is not limited to, a hardware processor configured to count the number of one or more first time periods being included in a target time period. Each of the one or more first time periods has a plurality of communications each of which satisfies at least a condition. In some cases, the condition can be set by a user and can be changed by a user or by using software. The plurality of communications includes two communications which are more distant in time from each other than a second time period which is shorter than the first time period.

Further features and aspects of the present disclosure will become apparent from the following detailed description of exemplary embodiments with reference to the attached drawings.

BRIEF DESCRIPTION OF THE DRAWINGS

FIG. 5 is a diagram which shows an example of the communication log acquired by a communication log acquisitor.

FIG. 7 is a diagram which describes a specific example of processing of outputting information based on the count number by the counter.

DETAILED DESCRIPTION OF THE EMBODIMENTS

Figure 1:
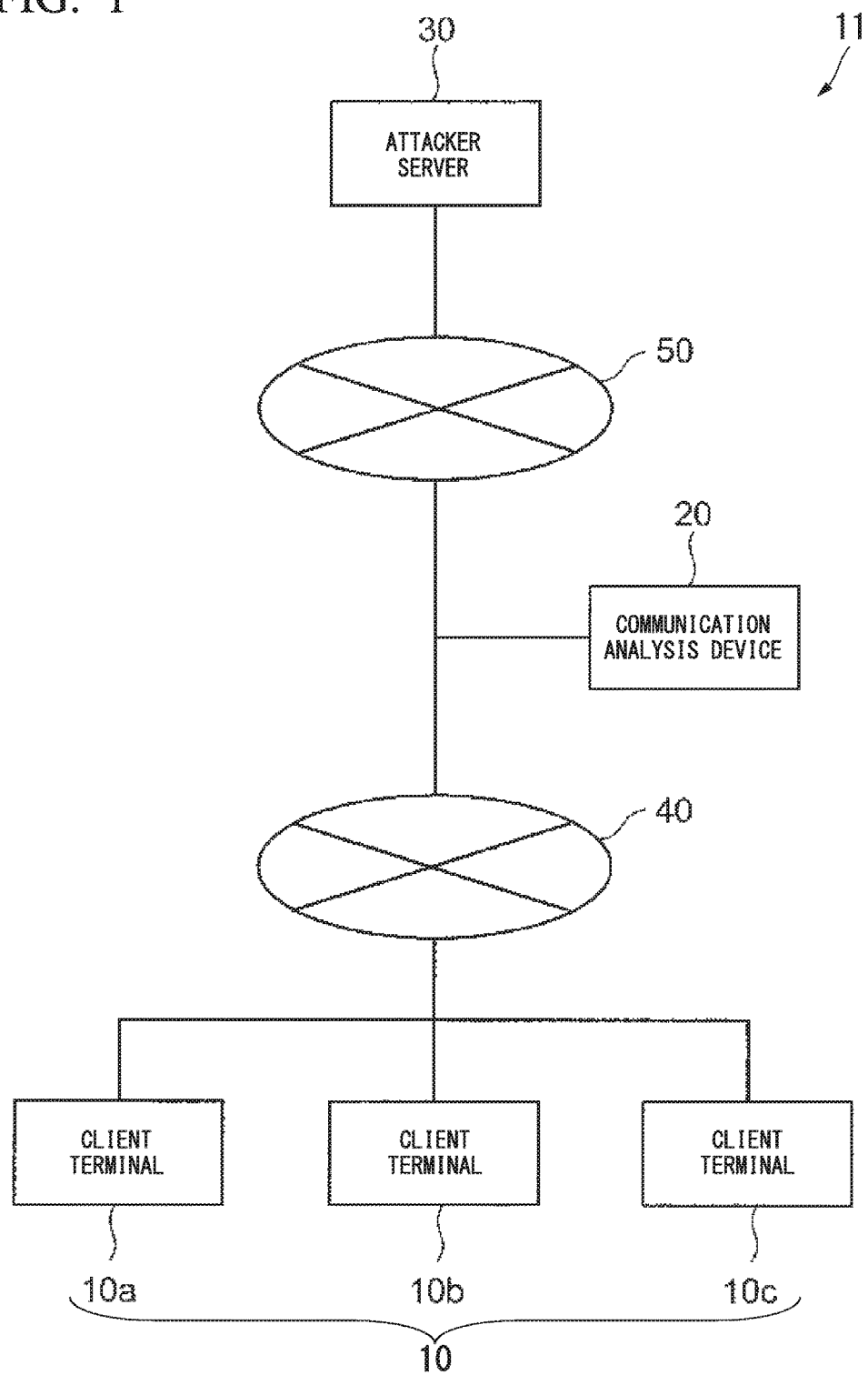
FIG. 1 is a diagram which shows an overall configuration of a computer system to which the present embodiment is applied.

In some embodiments, an information processing system may include, but is not limited to, a hardware processor configured to count the number of one or more first time periods being included in a target time period. Each of the one or more first time periods has a plurality of communications each of which satisfies at least a condition. In some cases, the condition can be set by a user and can be changed by a user or by using software. The plurality of communications includes two communications which are more distant in time from each other than a second time period which is shorter than the first time period.

In some cases, the two communications are more distant in time from each other than a second time period which is defined on the basis of the first time period.

In some cases, the hardware processor may be configured to count a respective number of the one or more first time periods having a plurality of communications for each of a plurality of conditions, the plurality of communications including at least two communications which are more distant in time from each other than a second time period which is shorter than the first time period.

In some cases, the hardware processor may be configured to display at the same time the respective numbers counted for the plurality of conditions.

In some cases, the hardware processor may be configured to display a list of the respective numbers counted in a counted number order.

In some cases, the hardware processor is configured to count a respective number of the one or more first time periods having a plurality of communications for each of a plurality of conditions. The plurality of communications may include two communications which are more distant in time from each other than a time period which is shorter than the first time period. The hardware processor may be configured to determine whether the respective number counted for each of the plurality of conditions satisfies a counted-number condition. In some cases, the counted-number condition can be set by a user and can be changed by a user or by using software.

The hardware processor may be configured to output information of a group of communications for which the respective number counted satisfies the counted-number condition.

In some cases, the condition may be that the two communications are identical in information at least in part to each other.

In some cases, the condition may be that sources and destinations of data transmissions are identical to each other between the two communications.

In other embodiments, an information processing method may include, but is not limited to, counting the number of one or more first time periods being included in a target time period. Each of the one or more first time periods having a plurality of communications each of which satisfies at least a condition, the plurality of communications including at least two communications which are more distant in time from each other than a second time period which is shorter than the first time period; and outputting the number of one or more first time periods counted.

In still other embodiments, a non-transitory computer-readable storage medium which stores a computer program, when executed by a computer, to cause the computer to perform at least: counting the number of one or more first time periods being included in a target time period. Each of the one or more first tinge periods having a plurality of communications each of which satisfies at least a condition, the plurality of communications including at least two communications which are more distant in time from each other than a time period which is shorter than the first time period.

In yet other embodiments, an information processing system may include, but is not limited to, an acquisitor configured to acquire information eluded in communication detected on a monitoring target network in a target time period; an extractor configured to extract communication having at least the same transmission destination of data in the communication based on the information acquired by the acquisitor; a counter configured to, for the communication extracted by the extractor, divide the target time period for each first time period in order, and to count the number of first time periods where an interval between a first communication and last communication in each of the first time periods exceeds a second time period; and an output unit which outputs information based on the number of first time periods counted by the counter.

In some cases, the output unit displays the communications for each transmission destination extracted by the extractor in order based on the number of the first time periods counted by the counter.

In some cases, the output unit outputs information related to the communication, each transmission destination of which extracted by the extractor, where the number of the first time periods counted by the counter satisfies at least a condition.

In some cases, the extractor extracts communication having the same transmission destination and source of data in the communication.

In additional embodiments, an information processing method may include, but is not limited to, acquiring information included in communication detected on a monitoring target network in a target time period; extracting communication having at least the same transmission destination of data in the communication based on the information acquired; for the communication extracted by the extractor, dividing the target time period for each first time period in order; counting the number of first time periods where an interval between a first communication and last communication in each of the first time periods exceeds a second time period; and outputting formation based on the number of first time periods counted by the counter.

In other embodiments, a non-transitory computer-readable storage medium which stores a commuter program, when executed by a computer, to cause the computer to perform at least: acquiring information included in communication detected on a monitoring target network in a target time period; extracting communication having at least the same transmission destination of data in the communication based on the information acquired; for the communication extracted by the extractor, dividing the target time period for each first time period in order; and counting the number of first time periods where an interval between a first communication and last communication in each of the first c periods exceeds a second time period.

Hereinafter, an embodiment of the present invention will be described in detail with reference to accompanying drawings.

<System Configuration>

First, a computer system to which an embodiment of the present invention is applied will be described. FIG. 1 is a diagram which shows an overall configuration example of a computer system 11 to which the embodiment of the present invention is applied. As shown in FIG. 1, in the computer system 11, client terminals 10$a$, 10$b$, and 10$c$ are connected to an in-house local area network (LAN) 40. In addition, a communication analysis device 20 is connected to both the in-house LAN 40 and the internet 50. Furthermore, an attacker server 30 is connected to the internet 50.

The client terminals 10$a$, 10$b$, and 10$c$ are computers used by users, and are realized in, for example, a personal computer, workstations, or other computer devices. In addition, in the embodiment, it is assumed that the client terminals 10$a$, 10$b$, and 10$c$ are infected with malware. Here the malware is a generic name for malicious software and malicious codes created with an intention to perform illegal and harmful operations. For example, a bot which is a type of malware may infect a computer, wait for an instruction from an attacker by being connected to a control server referred to as a command and control (C&C) server, and execute processing as instructed on the infected computer.

In FIG. 1, the client terminals 10$a$, 10$b$, and 10$c$ are shown, but these are collectively referred to as client terminals 10, when they do not need to be distinguished from each other. In addition, only three client terminals 10 are shown in FIG. 1, but the number of client terminals 10 is not limited to three as shown.

The communication analysis device 20 sets a network between an in-house LAN 40 and the internet 50 as a monitoring target, and outputs information on communication detected on the monitoring target network based on a communication interval. The information output based on a communication interval is information for detecting unauthorized communication highly likely to be an attack. Specifically, the communication analysis device 20 outputs information on communication accessing the internet 50 from the client terminal 10 via the in-house LAN 40 to detect unauthorized communication by malware. In addition, the communication analysis device 20 outputs information based on, for example, a log of communication and the like stored in a proxy server (not shown) installed so as to be gone through when there is an access to the internet 50 from the client terminal 10 via the in-house LAN 4.

The communication analysis device 20 may be provided in a communication device such as a gateway, or may be provided independently from the communication device.

In addition, in FIG. 1, the communication analysis device 20 is not installed in-line on a communication line between the in-house LAN 40 and the internet 50, and is configured to acquire a communication log from, for example, the proxy server and the like. As another example, the communication analysis device 20 may be configured to be installed in-line.

In the embodiment, the communication analysis device 20 is used as one example of the information processing system. In the embodiment, a method of processing performed by the communication analysis device 20 is used as an example of an information processing method.

The attacker server 30 is a server which is set as a connection destination by the client terminal 10 infected with malware, and is operated by an attacker. The attacker server 30 corresponds to a control server of the connection destination to which the client terminal 10 is connected to wait for an instruction from the attacker, for example, when the client terminal 10 is infected with a bot. In addition, only one attacker server 30 is shown in FIG. 1, but there may be two or more attacker servers 30.

The in-house LAN 40 is a network which connects computers and printers in a company using a dedicated line or the like so that data between the computers and the printers can be transmitted or received.

The internet 60 is a huge network which connects worldwide networks to each other sing transmission control protocol/internet protocol (TCP/IP).

As described above, in the embodiment, the client terminal 10 is connected to the attacker server 30 which is an unauthorized server when infected with malware. At this time, the client terminal 10 repeatedly performs communication with the attacker server) at an interval of, for example, 10 seconds and the like, to execute processing according to an instruction from the attacker server 30. Therefore, the communication analysis device 20 examines a communication interval for communication accessing the internet 50 from the client terminal 10 via the in-house LAN 40, and outputs information for detecting communication repeatedly performed which is likely to be communication with the attacker server 30.

<Functional Configuration of Communication Analysis Device>

Figure 2:
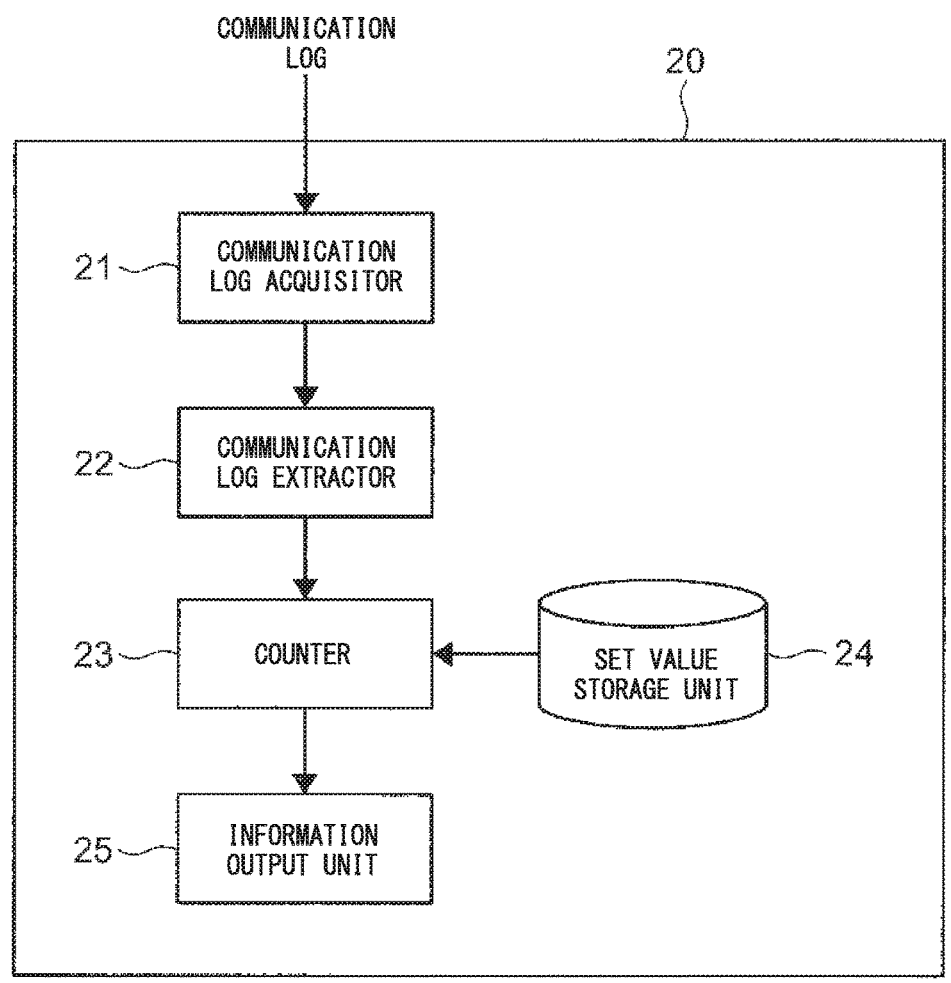
FIG. 2 is a block diagram which shows a functional configuration example of a communication analysis device according to the embodiment.

Next, a functional configuration of the communication analysis device 20 will be described. FIG. 2 is a block diagram which shows a functional configuration example of the communication analysis device 20 according to the embodiment.

As shown in FIG. 2, the communication analysis device 20 includes a communication log acquisitor 21 configured to acquire a log of communication detected on a network between the in-house LAN 40 (refer to FIG. 1) and the internet 50 (refer to FIG. 1), and a communication log extractor 22 configured to extract a communication log which is set as an analysis target among the acquired communication logs. In addition, the communication analysis device 20 includes a counter 23 configured to divide an acquisition target time period of the communication log into lengths of a first time period that is a predetermined period, and to count each first time period if an interval between first communication and last communication exceeds a second time period that is a predetermined period, a set value storage unit 24 configured to store set values of the first time period and the second time period used in the count processing by the counter 23, and an information output unit 25 configured to output information based on a count number counted by counter 23.

The communication log acquisitor 21 as an example of an acquisitor sets a network between the in-house LAN 40 and the internet 50 as a monitoring target, and acquires a log of communication detected on the monitoring target network. Here, the communication log acquisitor 21, for example, with an operation of an administrator as a trigger, acquires a log of the communication accessing the internet 50 from the client terminal 10 via the in-house LAN 40 from the proxy server (not shown).

As a communication log, for example, a period designated by an administrator or a period predetermined such as one week is set as an acquisition target time period, and a communication log detected within the target time period is acquired. In addition, the communication log includes information on a transmission destination of data in the communication, information on a transmission source of data, and information on a date and time when communication is performed. The communication log is not limited to a configuration in which the communication log is acquired from the proxy server, and, for example, may be configured to be saved in the communication analysis device 20 when the communication analysis device 20 is installed in-line, and the communication log may be acquired from the communication analysis device 20.

The communication log extractor 22 as an example of an extractor extracts a set of communication logs which are analysis targets among the communication logs acquired by the communication log acquisitor 21. Here, the communication log extractor 22 specifies information capable of identifying a transmission destination of data (hereinafter, referred to as transmission destination information) and information capable of identifying a transmission source of data (hereinafter, referred to as transmission source information) for each of the communication logs acquired by the communication log acquisitor 21. The transmission destination information includes information such as a domain name or an IP address of a device which is a transmission destination of data, a uniform resource locator (URL) of a transmission destination, and the like. In addition, the transmission source information includes information such as an IP address of the client terminal 10 which is a transmission source of data, a user name set for a user using the client terminal 10, a computer name set in the client terminal 10, and the like.

Then, the communication log extractor 22 sets a plurality of communication logs having the same pair of a transmission destination and a transmission source as an analysis target and extracts a communication log for each of the pairs on the basis of the transmission destination information and the transmission source information of each communication log. For example, when there are 1000 communication logs whose transmission destination domains are "domain A" and transmission source user names are "user A" among the communication logs acquired by the communication log acquisitor 21, the communication log extractor 22 extracts a set of the 1000 communication logs as an analysis target.

In addition, in the following description, a case in which the communication log extractor 22 extracts a plurality of communication logs having the same pair of a transmission destination and a transmission source as an analysis target will be described, but the communication log extractor 22 may extract communication logs having at least the same transmission destination data as an analysis target. In this case, for example, if there are 2000 communication logs whose transmission destination domains are "domain A", the 2000 communication logs are collectively extracted as an analysis target.

The counter 23 as an example of a counter divides an acquisition target time period into lengths of the first time period in order from the start of the target time period for a set of communication logs extracted as an analysis target by the communication log extractor 22. Then, the counter 23 determines whether an interval between first communication and last communication in a first time period is longer than a second time period for each separate first time period. Here, if the interval between first communication and last communication exceeds the second time period, the counter 23 increases a count number by one. On the other hand, if the interval between a first communication and a last communication does not exceed the second time period, the counter 23 does not count.

For example, when there are 100 separate first time periods, the counter 23 determines whether an interval between first communication and last communication of an analysis target communication log is longer than the second time period for each of the 100 first time periods. Then, the counter 23 counts each time it is determined that the interval exceeds the second time period. For example, among 100 first time periods, if there are 60 first time periods having the interval between first communication and last communication exceeding the second time period, the count number becomes 60.

The set value storage unit 24 stores set values of the first time period and the second time period used in the count processing performed by the counter 23. As the first time period, periods such as 10 minutes, 5 minutes, and 1 minute are set. In addition, the second time period is shorter than the first time period, and, for example, when the first time period is 10 minutes, the second time period is set to be 8 minutes, when the first time period is 5 minutes, the second time period is set to be 4 minutes, and when the first time period is 1 minute, the second time period is set to be 40 seconds or the like. Values of the first time period and the second time period are set in advance, for example, by an input of an administrator.

The information output unit 25 as an example of an output unit outputs information based on the count number counted by the counter 23. Here, the information output unit 25 acquires the count number counted by the counter from the set of communication logs extracted as an analysis target by the communication log extractor 22. Then, the information output unit 25 outputs information based on the acquired count number. For example, the information output unit 25 displays the set of communication logs side by side in order based on the count number such as in a descending order of the count number or an ascending order of the count number on a display unit (not shown).

In addition, for communication whose count number satisfies a predetermined reference, the information output lit 25 may display information related to the communication on a display unit. For example, for a set of communication logs whose count numbers exceed a predetermined threshold value, the information output unit 25 displays an indication that the communication is likely to be unauthorized communication or displays an alert. Moreover, for example, for a set of communication logs whose count numbers are equal to or less than the predetermined threshold value, the information output unit 25 displays an indication that the communication is normal communication.

<Hardware Configuration Example of Communication Analysis Device>

Figure 3:
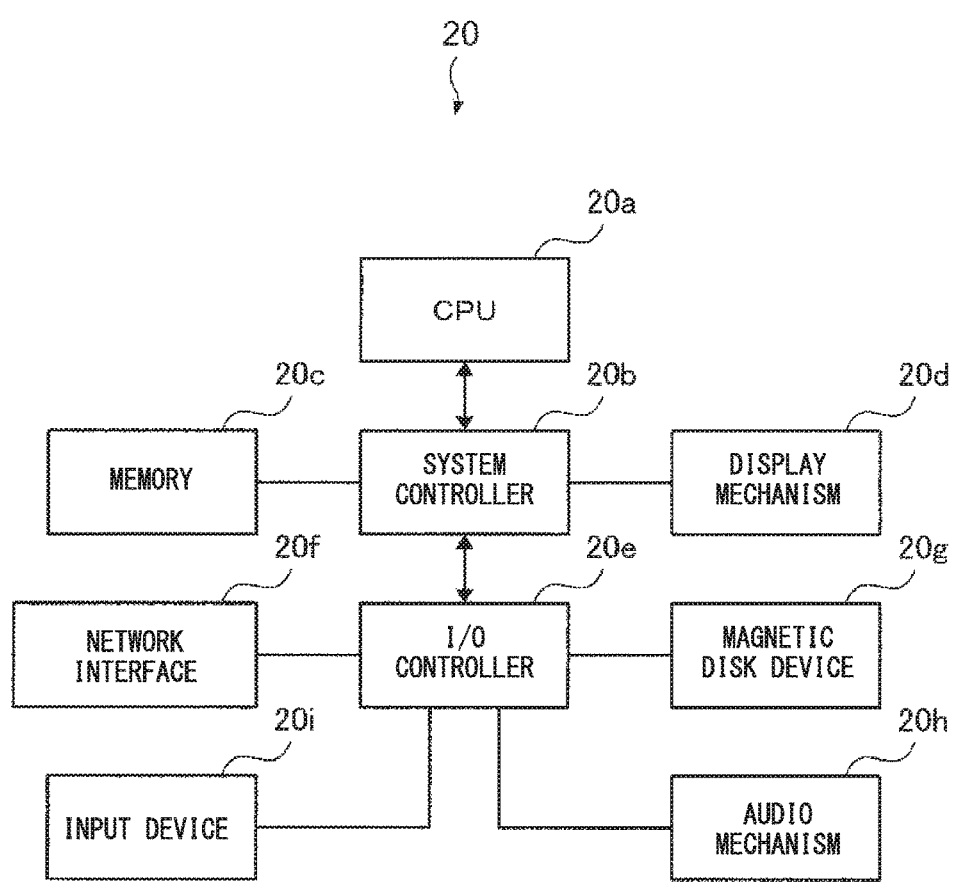
FIG. 3 is a diagram which shows an example of a hardware configuration of a computer suitable for applying the communication analysis device.

Next, a hardware configuration of the communication analysis device 20 according to the present embodiment will be described. FIG. 3 is a diagram which shows an example of the hardware configuration of a computer suitable for applying the communication analysis device 20. As shown in FIG. 3, the communication analysis device 20 includes a central processing unit (CPU) 20a which is an arithmetic operation unit, and a memory 20c which is a main storage unit. In addition, the communication analysis device 20 includes, as external devices, a magnetic disk device (hard disk drive (HDD)) 20g a network interface 20f, a display mechanism 20d including a display device, an audio mechanism 20h, an input device 20i such as a keyboard or a mouse, and the like. Moreover, the communication analysis device 20 includes a system controller 20b and an I/O controller 20e.

In a configuration example shown in FIG. 3, the memory 20c and the display mechanism 20d are connected to the CPU 20a via the system controller 20b. In addition, the network interface 20f, the magnetic disk device 20g, the audio mechanism 20h, and the input device 20i are connected to the system controller 20b via the I/O controller 20e. The components are connected to each other by various types of buses such as a system bus and an input/output bus.

Moreover, in FIG. 3, an OS program and an application program are saved in the magnetic disk device 20g. Then, these programs are read into the memory 20c and executed by the CPU 20a, and thereby functions of the communication log acquisitor 21, the communication log extractor 22, the counter 23, and the information output unit 25 of the communication analysis device 20 according to the present embodiment are realized. In addition, for example, the set value storage unit 24 is realized by a storage unit such as the magnetic disk device 20g.

FIG. 3 only illustrates an example of the hardware configuration of a computer suitable for applying the present embodiment. The present embodiment can be widely applied to a device that outputs information based on a count number, and is not limited to being realized in the configuration shown in FIG. 3. In other words, a configuration for realizing the present embodiment is not limited to the configuration shown in FIG. 3.

<Processing Procedure of Communication Analysis Device>

Figure 4:
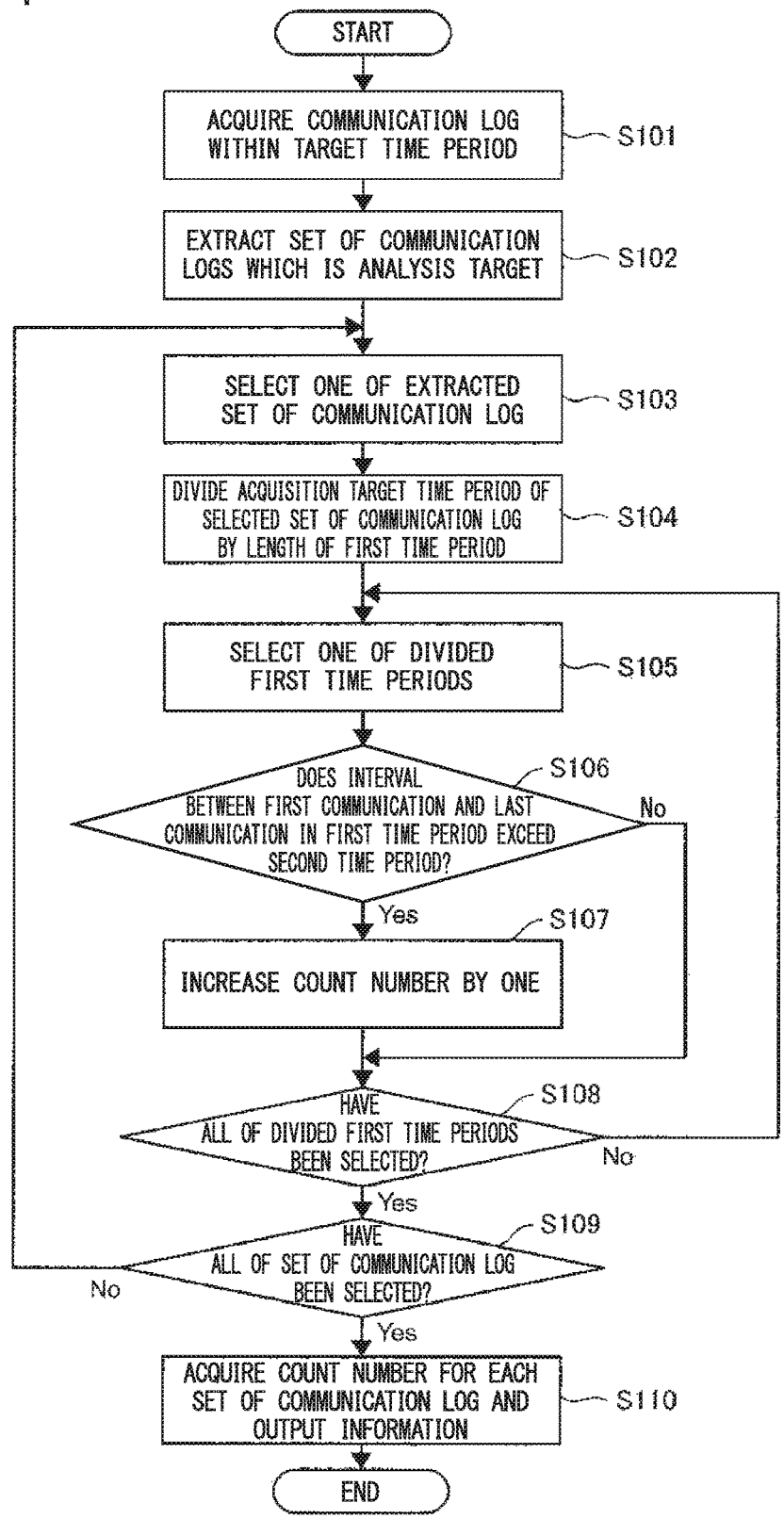
FIG. 4 is a flowchart which shows an example of a procedure for outputting information on the basis of a count number on the basis of a communication log.

Next, a procedure of processing in which the communication analysis device 20 outputs information on the basis of a count number on the basis of a communication log will be described. FIG. 4 is a flowchart which shows an example of the procedure in which the communication analysis device 20 outputs information on the basis of a count value on the basis of a communication log.

First, the communication log acquisitor 21 acquires a log of communication detected on a network between the in-house LAN 40 and the internet 50 within an acquisition target time period and accessing the internet 50 from the client terminal 10 from the proxy server (step 101). Next, the communication log extractor 22 extracts a set of communication logs which is an analysis target among the communication logs acquired by the communication log acquisitor 21 (step 102). Here, the communication log extractor 22 collects and extracts a plurality of communication logs having the same pair of a transmission destination and a transmission source based on transmission destination information and transmission source information of each communication log. Moreover, in general, many communication logs within a target time period are accumulated, and there are many pairs of a transmission source and a transmission destination. For this reason, the communication log extractor 22 extracts a set of communication logs for each pair of a transmission destination and a transmission source.

Next, the counter 23 selects one of the extracted sets of communication logs (step 103). Then, the counter 23 divides an acquisition target time period by a length of the first time period in order from the front of the target time period for the selected set of communication logs (step 104). Next, the counter 23 selects one of the divided first time periods (step 105). Then, the counter 23 calculates an interval between first communication and last communication occurring within the selected first time period and determines whether the calculated interval exceeds the second time period on the basis of an occurrence date and time of the communication log (step 106).

When it is determined that the interval between first communication and last communication exceeds the second time period (Yes in step 106), the counter 23 increases a count number by one (step 107). On the other hand, when it is determined that the interval between first communication and last communication does not exceed the second time period (No in step 106), the counter 23 keeps the count number as it is without increasing the count number.

Next, the counter 23 determines whether all of the first time periods obtained by division in step 104 have been selected (step 108). When it is determined that there are first time periods that have not yet been selected (No in step 108), the procedure proceeds to step 105. Accordingly, the counter 23 selects one of the first time periods that are not selected yet (step 105). On the other hand, when it is determined that all of the first time periods are selected (Yes in step 108), the counter 23 determines whether all of the sets of communication logs extracted in step 102 are selected (step 109).

When it is determined that there are sets of communication logs which are not selected yet (No in step 109), the procedure proceeds to step 103. Accordingly, the counter 23 selects one of the sets of communication logs which are not selected yet (step 103). On the other hand, when it is determined that all of the sets of communication logs are selected (Yes in step 109), the information output unit 25 then acquires a count number for each of the sets of communication logs, and outputs information based on the acquired count number (step 110). Here, the information output unit 25 acquires a count number counted in steps 105 to 108 and outputs information based on the acquired count number. For sets of communication logs, for example, the information output unit 25 displays the sets of communication logs side by side in a descending order of the count number, and, for sets of communication logs whose count numbers exceed a predetermined threshold value, the information output unit 25 displays an indication that the communication is likely to be unauthorized communication. For example, the information output unit 25 may perform any one of displaying the sets of communication logs side by side in a descending order of the count number and displaying an indication that, for sets of communication logs whose count numbers exceed a predetermined threshold value, the communication is likely to be unauthorized communication, or may perform both. In addition, without being limited to this display, the information output unit 25 may output and display information different from this.

Then, the processing flow ends.

<Example of Communication Log>

Next, the communication logs acquired by the communication log acquisitor 21 will be described. FIG. 5 is a diagram which shows an example of the communication logs acquired by the communication log acquisitor 21.

In a communication log shown in FIG. 5, the communication log includes information on an IP address (transmission destination IP address) of a device which is a transmission destination of data, an IP address (transmission source IP address) of the client terminal 10 which is a transmission source of data, a user name (transmission source user name) of the client terminal 10 which is a transmission source, a computer name (transmission source computer name) of the client terminal 10 which is a transmission source, and a date and time (communication date and time) when communication occurs. For example, in a communication log of number 1, an IP address of a device which is a transmission destination is "50,1,1,1", and an IP address of the client terminal 10 which is a transmission source is "111.22.33.44". For example, in the communication log of number 1, a user name of the client terminal 10 which is a transmission source is "User A", a computer name of the client terminal 10 which is a transmission source is "LAN-PC1", and a communication occurrence date and time is "10 o'clock on Jan. 1, 2015".

In addition, for example, communication logs of number 1, number 3, and number 4 have an IP address of a transmission destination of "50.1.1.1", an IP address of a transmission source of "111.22.33.44, and the same pair of the transmission destination and the transmission source. For this reason, the communication log extractor 22 extracts communication logs of number 1, number 3, and number 4 when extracting a set of communication logs which is set as an analysis target from the communication logs shown in FIG. 5.

Here, in the communication logs shown in FIG. 5, there are a transmission source IP address, a transmission source user name, and a transmission source computer name as transmission source information, and the communication g extractor 22 may extract a set of communication logs using any piece of information in the transmission source information. However, for example, when an IP address is automatically assigned to the client terminal 10 by a dynamic host configuration protocol (DHCP), communication is performed using different IP addresses even with the same client terminal 10 in some cases. In such a ease, the communication log extractor 22 may identify the client terminal 10 which is a transmission source on the basis of the transmission source computer name, the transmission source user name, and the like, and extract a set of communication logs. Types of information included in the communication logs are not limited to those shown in FIG. 5, and, for example, a domain name of a device which is a transmission destination may be also used as the transmission destination information.

<Specific Example of Count Processing>

Next, count processing by the counter 23 will be described with a specific example. FIGS. 6A, 6B, 6C, and 6D are diagrams which describe specific examples of the count processing by the counter 23. In examples shown in FIG. 6, for example, two first time periods are shown, but communication in one first time period will be described in the following description.

Figure 6A:
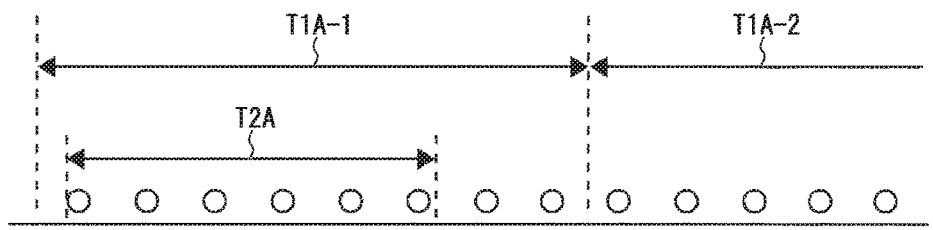
FIG. 6A is a diagram which describes a specific example of count processing by a counter.

First, in the example shown in FIG. 6A, a first time period T1A-1, a second first time period T1A-2, and a second time period T2A. In the first time period T1A-1 are shown. In the example shown in FIG. 6A, repetitive communication is performed, and eight times of communication is performed within the first time period T1A-1. Then, an interval between first communication and last communication exceeds the second time period T2A. For this reason, the counter 23 increases a count number by one.

Figure 6B:
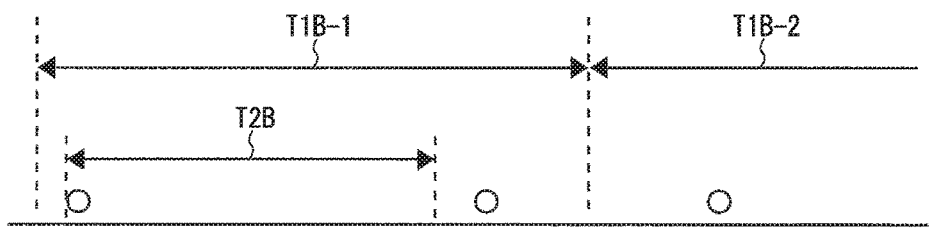
FIG. 6B is a diagram which describes a specific example of the count processing by the counter.

In an example shown in FIG. 6B, a first time period T1B-1, a second first time period T1B-2, and a second time period T2B in the first time period T1B-1 are shown. In the example shown in FIG. 6B, two times of communication occur within the first time period T1B-1 and an interval between first communication and last communication exceeds the second time period T2B. For this reason, even though the number of times communication occurs in a case of FIG. 6B is less than in a case of FIG. 6A, the counter 23 increases a count number by one.

Figure 6C:
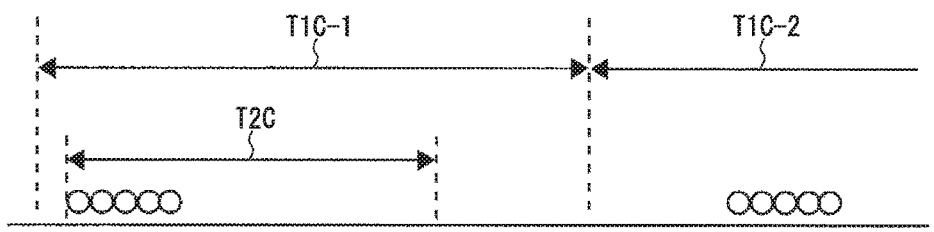
FIG. 6C is a diagram which describes a specific example of the count processing by the counter.

In an example shown in FIG. 6C, a first time period T1C-1, a second first time period T1C-2, and a second time period T2C in the first time period T1D-1 are shown. In the example shown in FIG. 6D, five times of communication occur within the first time period T1C-1, but five times of communication occur within a short period of time and an interval between first communication and last communication does not exceed the second time period T2C. For this reason, the counter 23 does not count.

Figure 6D:
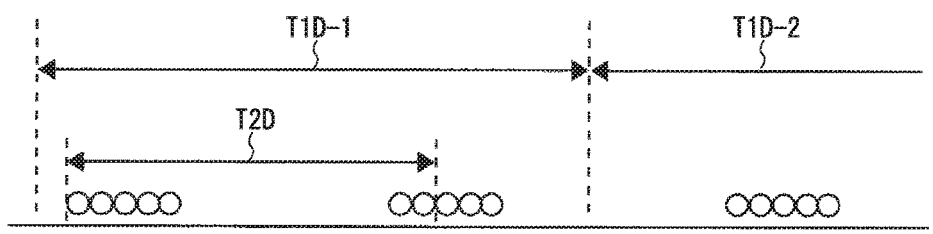
FIG. 6D is a diagram which describes a specific example of the count processing by the counter.

In an example shown in FIG. 6D, a first time period T1D-1, a second first time period T1D-2, and a second time period T2D in the first time period T1D-1 are shown. In the example shown in FIG. 6D, ten times of communication occur within the first time period T1D-1 and an interval between first communication and last communication exceeds the second time period T2D. For this reason, the counter 23 increases a count number by one.

Here, in the examples shown in FIGS. 6A, 6B, 6C, and 6D, if the first time periods T1A-1, T1B-1, T1C-1, and T1D-1 are set to one minute and the second time periods T2A, T2B, T2C, and T2D are set to 40 seconds, in the example of FIG. 6A, repetitive communication occurs at intervals of about eight seconds. As described above, when the client terminal 10 is infected with malware, the client terminal 10 performs repetitive communication with the attacker server 30 in some cases. When such repetitive communication occurs, if counting is performed in any first time period by the counter 23, counting is highly likely to be performed in another first time period. For this reason, by outputting information indicating that communication has a large count number, the communication is ascertained as communication which is repeatedly performed and is likely to be communication by malware.

In addition, in the example shown in FIG. 6B, the two times of communication occur in the first time period T1B-1, and whether the communication repeatedly occurs due to malware or the communication occurs in one instance as normal communication unconnected to malware cannot be distinguished. Here, if two times of communication occur in one shot, the communication is not likely to be counted even in another first time period. For this reason, for communication that occurs in one shot as normal communication, information indicating that the communication has a small count number is output. On the other hand, if two times of communication is communication that repeatedly occurs by malware, the communication is highly likely to be counted in another first time period. For this reason, in the same manner as the case shown in FIG. 6A, by outputting information indicating that the communication has a large count number, the communication is ascertained as communication which is repeatedly performed and is highly likely to be performed by malware.

Here, when communication repeatedly occurs by malware and an interval of the communication exceeds one minute for the first time periods T1A-1, T1B-1, T1C-1, and T1D-1, since more than two times of communication are not performed in the first time periods T1A-1, T1B-1, T1C-1, and T1D-1, counting is not performed by the counter 3. In such a case, if set values of the first time periods T1A-1, T1B-1, T1C-1, and T1D-1 are modified by being lengthened, counting is performed by the counter 23.

Next, the example shown in FIG. 6C shows, for example, a case in which a user browses a web page via the internet, and thereby normal communication continuously occurs within a short period of time. Several times of communication occur within the first time period T1C-1, but an interval between first communication and last communication is shorter than the second time period T2C, and thus counting is not performed by the counter 23. That is, for communication which is not repeatedly performed in a regular manner and is normal communication continuously occurring in a short period of time, counting is not performed and information indicating that the communication has a small count numbers is output.

On the other hand, the example shown in FIG. 6D shows, for example, a case in which a user further browses other web pages after browsing a web page, and thereby further communication occurs continuously after continuous communication occurs within a short period of time. In this case, the communication is not communication repeatedly performed by malware but normal communication, but since an interval between first communication and last communication exceeds the second time period T2D, the counter 23 performs processing of increasing a count number by one.

In this manner, a user browses various web pages when browsing web pages, and thereby continuous communication occurs at a plurality of places and an interval between first communication and last communication exceeds the second time period T2D in some cases. However, when browsing a web page, in general, a user does not frequently change a web page to browse and continuous communication does not occur at a plurality of places all the tune. In addition, it is conceivable that a user may have a limited time, such as several hours, to browse a web page. For this reason, counting is performed by the counter 23 in a certain first time period, but is not necessarily performed in another first time period. Furthermore, the counting performed may be limited by the time the user browses a web page, and the count number becomes smaller as compared with communication repeatedly performed. As a result, when continuous normal communication occurs at a plurality of places within the first time period, information indicating that the communication has a small count number is output.

In this manner, the counter 23 performs processing of increasing a count number by one if intervals between first communication and last communication within the first time periods T1A-1, T1B-1, T1C-1, and T1D-1 exceed the second time periods T2A, T2B, T2C, and T2D. For this reason, when communication is repeatedly performed by malware, the count number counted the first time periods T1A-1, T1B-1, T1C-1, and T1D-1 is increased, and thereby the communication is easily ascertained by an administrator as likely unauthorized communication due to malware.

On the other hand, when communication is not repeatedly performed but occurs in one shot or even when continuous communication occurs at a plurality of places, the communication is counted by the counter 23 in some cases. However, a count number of such communication is not likely to be continuously added, and the count number becomes smaller as compared to communication repeatedly performed if a target time period for acquiring a communication log is extended.

<Specific Example of Processing of Outputting Information Based on Count Number>

Next, processing of outputting information based on a count number by the counter 23 will be described with a specific example. FIG. 7 is a diagram which describes a specific example of the processing of outputting information based on the count number by the counter 23. In an example shown in FIG. 7, among communication logs accumulated within, for example, one day, sets of communication logs having the same pair of a transmission destination IP address and a transmission source IP address are set as an analysis target, and respective sets are arranged from the top in a descending order of count number.

For example, for a set of communication shown in number 1, a set of communication logs whose transmission destination IP address is "50.1.1.1" and transmission source IP address is "111.22.33.44" shows that the count number is 1000. In the same manner, count numbers are indicated also for other sets of communication logs, and respective sets of communication logs are arranged from the top in descending order of count number. According to the count numbers displayed in this manner, an administrator determines that, for example, a communication log having a large count number is likely to be unauthorized communication, and may respond by examining the communication log in detail.

Moreover, the information output unit 25 may perform a display indicating that the set of communication logs is likely to be unauthorized communication if the count number exceeds a predetermined threshold value. For example, if the predetermined threshold value as 500, sets of communication logs of numbers 1 to 4 shown in FIG. 7 are displayed as likely unauthorized communication.

As described above, the communication analysis device 20 according to the embodiment of the present invention calculates an interval between first communication and last communication for each first time period for a log of communication detected on a monitoring target network, and determines whether the calculated interval exceeds a second time period. Then, the communication analysis device 20 increases a count member by one if the calculated interval exceeds the second time period, and outputs information based on the count counted for each first time period.

For this reason, a client terminal 10 infected with malware performs repetitive communication, and thereby the count number is increased and the communication is easily ascertained by an administrator as communication which is likely to be unauthorized communication on the basis of the output information. Here, communication repeatedly occurring is not limited to communication by malware, and, for example, normal communication and the like which is performed to update anti-virus software is also repeatedly performed in some cases. In the present embodiment, there are some cases in which not only communication by malware but also normal communication repeatedly performed are ascertained as likely unauthorized communication. However, for such normal communication, an administrator may register it, for example, as normal communication advance, or determine and register it as normal communication based on the transmission destination IP address. Here, for such normal communication, the administrator may perform, for example, any one method of registering it as normal communication in advance and determining and registering it as normal communication based on the transmission destination IP address, or may perform both. In addition, registration of such normal communication as normal communication is not limited to these methods, and an administrator may perform registration in other methods different from these methods.

Thus, communication registered as normal communication is excluded from, for example, a count target, and may be displayed as normal communication on a display screen used for informing an administrator. Here, the communication registered as normal communication may be processed in any one method of excluding it from, for example, a count target, and displaying it as normal communication on a display screen by which an administrator is informed, or may be processed in both methods. Moreover, processing for the communication registered as normal communication is not limited to these methods, but may be also performed in other methods different from these methods.

In addition, the communication analysis device 20 may be configured to count traffic flowing on a current network, not the communication logs accumulated in the proxy server. In this case, the communication analysis device 20 ascertains communication in a first time period for each pair of a transmission destination and a transmission source, and increases a count number by determining whether to count the communication. Then, for example, when the count number exceeds a predetermined threshold value, the information output unit 25 displays an alert on the display mechanism 20d and the like and informs an administrator.

A program realizing the embodiment of the present invention may be provided in a state of being stored in a computer readable recording medium such as a magnetic recording medium, an optical recording medium, a magneto-optical recording medium, or a semiconductor memory. In addition, the program can be also provided using a communication unit such as the internet. Here, the magnetic recording medium is, for example, a magnetic tape, a magnetic disk, or the like. The optical recording medium is, for example, an optical disc or the like.

The present invention has been described using the embodiment, but a technical scope of the present invention is not limited to the embodiment described above. It will be apparent to those skilled in the art that various modifications and alternative embodiments can be adopted without departing from the spirit and scope of the present invention.

The apparatus, systems and methods in the above-described embodiments may be deployed in part or in whole through machines, a system of circuits, circuitry, hardware processors that executes computer software, software components, program codes, and/or instructions on one or more machines, a system of circuits, circuitry, hardware processors. In some cases, the one or more machines, a system of circuits, circuitry, hardware processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more hardware processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more hardware processors may enable execution of multiple programs, threads, and codes. The threads may be executed simultaneously to enhance the performance of the one or more hardware processors and to facilitate simultaneous operations of the application. Program codes, program instructions and the like described herein may be implemented in one or more threads. The one or more hardware processors may include memory that stores codes, instructions and programs as described herein. The machines, a system of circuits, circuitry, hardware processors may access a non-transitory processor-readable storage medium through an interface that may store codes, instructions and programs as described herein and elsewhere. The non-transitory processor-readable storage medium associated with the machines, a system circuits, circuitry, hardware processors for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods, apparatus and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interlace may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods, apparatus and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to tall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

As used herein, the following directional terms "front, back, above, downward, right, left, vertical, horizontal, below, transverse, row and column" as well as any other similar directional terms refer to those instructions of a device equipped with embodiments of the present invention. Accordingly, these terms, as utilized to describe embodiments of the present invention should be interpreted relative to a device equipped with embodiments of the present invention.

Each element for the system, device and apparatus described above can be implemented by hardware with or without software. In some cases, the system, device and apparatus may be implemented by one or more hardware processors and one or more software components wherein the one or more software components are to be executed by the one or more hardware processors to implement each element for the system, device and apparatus. In some other cases, the system, device and apparatus may be implemented by a system of circuits or circuitry configured to perform each operation of each element for the system, device and apparatus.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. An information processing system for detecting malware, comprising:
a hardware processor configured to, when executing a software component,
extract a respective series of repeated communications in a target time period between each pair of transmission source information and transmission destination information identified over a monitoring network for detecting malware;
set a first time period for a first predetermined period of time;
set a second time period for a second predetermined period of time, the second time period being a sub-time period of the first time period;
count, respectively, for each pair of the transmission source information and the transmission destination information, a respective number of first time periods being included in the target time period when a time distance between two most time-distant communications is longer than the second time period, which is shorter than the first time period; and
output information relating to the detection of malware based on the count,
wherein the two most time-distant communications are included in a plurality of communications in each of the first time periods,
wherein the second time period is concurrently running with the first period, and
wherein the two most time-distant communications are a first communication occurring first in the first time period and a last communication occurring last in the first time period.

2. The information processing system according to claim 1,
wherein the two communications are more distant in time from each other than a second time period, which is defined on the basis of the first time period.

3. The information processing system according to claim 1,
wherein the hardware processor is configured to count a respective number of the one or more first time periods having a plurality of communications for each of a plurality of conditions, the plurality of communications including at least two communications that are more distant in time from each other than a second time period, which is shorter than the first time period.

4. The information processing system according to claim 3,
wherein the hardware processor is configured to display at the same time the respective numbers counted for the plurality of conditions.

5. The information processing system according to claim 4,
wherein the hardware processor is configured to display a list of the respective numbers counted in a counted number order.

6. The information processing system according to claim 3,
wherein the hardware processor is configured to count a respective number of the one or more first time periods having a plurality of communications for each of a plurality of conditions, the plurality of communications including at least two communications that are more distant in time from each other than a second time period, which is shorter than the first time period;
the hardware processor is configured to determine whether the respective number counted for each of the plurality of conditions satisfies a counted-number condition; and
the hardware processor is configured to output information of a group of communications for which the respective number counted satisfies the counted-number condition.

7. The information processing system according to claim 1,
wherein the condition is that the two communications are identical in information at least in part to each other.

8. The information processing system according to claim 1,
wherein the condition is that sources and destinations of data transmissions are identical to each other between the two communications.

9. An information processing method, comprising:
extracting a respective series of repeated communications in a target time period between each pair of transmission source information and transmission destination information identified over one or more networks;
setting a first time period for a first predetermined period of time;
setting a second time period for a second predetermined period of time, the second time period being a sub-time period of the first time period; and
counting, respectively, for each pair of the transmission source information and the transmission destination information, a respective number of first time periods being included in the target time period when a time distance between two most time-distant communications is longer than the second time period, which is shorter than the first time period; and
outputting information relating to the detection of malware based on the count,
wherein the two most time-distant communications are included in a plurality of communications in each of the first time periods,
wherein the second time period is concurrently running with the first period, and
wherein the two most time-distant communications are a first communication occurring first in the first time period and a last communication occurring last in the first time period.

10. A non-transitory computer-readable storage medium that stores a computer program, when executed by a computer, to cause the computer to perform at least:
extracting a respective series of repeated communications in a target time period between each pair of transmission source information and transmission destination information identified over one or more networks;
setting a first time period for a first predetermined period of time;
setting a second time period for a second predetermined period of time, the second time period being a sub-time period of the first time period;
counting, respectively, for each pair of the transmission source information and the transmission destination information, a respective number of first time periods being included in the target time period when a time distance between two most time-distant communications is longer than the second time period, which is shorter than the first time period; and outputting information relating to the detection of malware based on the count, wherein the two most time-distant communications are included in a plurality of communications in each of the first time periods, wherein the second time period is concurrently running with the first period, and wherein the two most time-distant communications are a first communication occurring first in the first time period and a last communication occurring last in the first time period.

11. An information processing system, comprising:

an acquisitor configured to acquire information included in communication detected on a monitoring target network in a target time period, wherein the information includes transmission source information and transmission destination information identified over one or more networks;

an extractor configured to extract, based on the information acquired by the acquisitor, a respective series of repeated communications in the target time period between each pair of the transmission source information and the transmission destination information identified over the one or more networks;

a first setter to set a first time period for a first predetermined period of time;

a second setter to set a second time period for a second predetermined period of time, the second time period being a sub-time period of the first time period;

a counter configured to count, respectively, for each pair of the transmission source information and the transmission destination information, a respective number of first time periods being included in the target time period when a time distance between two most time-distant communications is longer than the second time period, which is shorter than the first time period, wherein the two most time-distant communications are included in a plurality of communications in each of the first time periods; and an outputter configured to output information based on the number of first time periods counted by the counter and to output information relating to the detection of malware based on the count, wherein the second time period is concurrently running with the first period, and wherein the two most time-distant communications are a first communication occurring first in the first time period and a last communication occurring last in the first time period.

12. The information processing system according to claim 11, wherein the outputter displays the communications for each transmission destination extracted by the extractor in order based on the number of the first time periods counted by the counter.

13. The information processing system according to claim 11, wherein the outputter outputs information related to the communication, each transmission destination of which extracted by the extractor, where the number of the first time periods counted by the counter satisfies at least a condition.

14. The information processing system according to claim 11, wherein the extractor extracts communication having the same transmission destination and source of data in the communication.

15. An information processing method, comprising:

acquiring information included in communication detected on a monitoring target network in a target time period, wherein the information includes transmission source information and transmission destination information identified over one or more networks;

extracting, based on the acquired information, a respective series of repeated communications in the target time period between each pair of transmission source information and transmission destination information identified over the one or more networks;

setting a first time period for a first predetermined period of time;

setting a second time period for a second predetermined period of time, the second time period being a sub-time period of the first time period;

counting, respectively, for each pair of the transmission source information and the transmission destination information, a respective number of first time periods being included in the target time period when a time distance between two most time-distant communications is longer than the second time period, which is shorter than the first time period, wherein the two most time-distant communication are included in a plurality of communications in each of the first time periods; and outputting information based on the number of first time periods counted by the counter and information relating to the detection of malware based on the count, wherein the second time period is concurrently running with the first period, and wherein the two most time-distant communications are a first communication occurring first in the first time period and a last communication occurring last in the first time period.

16. A non-transitory computer-readable storage medium that stores a computer program, when executed by a computer, to cause the computer to perform at least:

acquiring information included in communication detected on a monitoring target network in a target time period, wherein the information includes transmission source information and transmission destination information identified over one or more networks;

extracting, based on the acquired information, a respective series of repeated communications in the target time period between each pair of transmission source information and transmission destination information identified over the one or more networks;

setting a first time period for a first predetermined period of time;

setting a second time period for a second predetermined period of time, the second time period being a sub-time period of the first time period;

counting, respectively, for each pair of the respective source information and the transmission destination information, a respective number of first time periods being included in the target time period when a time distance between two most time-distant communications is longer than the second time period, which is shorter than the first time period, wherein the two most time-distant communications are included in a plurality of communications in each of the first time periods; and outputting information relating to the detection of malware based on the count, wherein the second time period is concurrently running with the first period, and wherein the two most time-distant communications are a first communication occurring first in the first time period and a last communication occurring last in the first time period.

* * * * *